United States Patent [19]

Scholl

[11] Patent Number: 4,633,717
[45] Date of Patent: Jan. 6, 1987

[54] THERMOCOUPLE VACUUM GAUGE

[75] Inventor: Richard A. Scholl, Palo Alto, Calif.

[73] Assignee: Varian Associates, Inc., Palo Alto, Calif.

[21] Appl. No.: 760,789

[22] Filed: Jul. 31, 1985

[51] Int. Cl.⁴ .............................................. G01L 21/14
[52] U.S. Cl. ..................................... 73/755; 374/164; 374/179
[58] Field of Search .................. 73/755; 374/143, 164, 374/179

[56] References Cited

U.S. PATENT DOCUMENTS 3,397,579  8/1968  Harvey ................................... 73/755
4,579,002  4/1986  Zettler ................................... 73/755

Primary Examiner—Donald O. Woodiel
Attorney, Agent, or Firm—Stanley Z. Cole; Kenneth L. Warsh

[57] ABSTRACT

A thermocouple pressure gauging system for measuring partial vacuum is provided which uses AC current to heat the thermocouple to constant temperature. A signal proportional to pressure is derived from the AC current needed to heat to constant temperature.

3 Claims, 3 Drawing Figures

THERMOCOUPLE VACUUM GAUGE

FIELD OF THE INVENTION

This invention pertains to a thermocouple apparatus to measure low pressures under partial vacuum, more particularly to an apparatus sensitive to pressures over a wider range.

BACKGROUND OF THE INVENTION

Thermocouples have long been used as a pressure sensing device for partial vacuums. The thermocouple is heated and the resulting temperature of the thermocouple is measured using the thermocouple EMF. As the gas pressure falls, the rate of cooling of the thermocouple by the gas decreases. As a result, either the temperature of the thermocouple for constant heating current rises or the current needed to keep the thermocouple at constant temperature decreases.

Thermocouple pressure gauges of the prior art are limited in their range and sensitivity by the noise generated by simultaneous heating during measurement. Prior art thermocouple gauges are insensitive at low pressures and in the range of pressures 10–100 Torr.

OBJECTS OF THE INVENTION

The object of the invention is to provide an inexpensive, modestly accurate, fast responding vacuum indicator using the thermocouple effect over many orders of magnitude of pressure.

BRIEF SUMMARY OF THE INVENTION

A servomechanism is used to supply amplitude modulated alternating current heating power to the thermocouple. The direct current EMF of the thermocouple is measured and compared to a reference voltage. This reference voltage is different for different ranges of pressure and in some ranges becomes proportional to decreases in pressure. The amplitude of the heating current is converted to a DC voltage and displayed as pressure.

These and further constructional and operational characteristics of the invention will be more evident from the detailed description given hereafter with reference to the figures of the accompanying drawings which illustrate preferred embodiments and alternatives by way of non-limiting examples.

DESCRIPTION OF THE PREFERRED EMBODIMENTS

Figure 1:
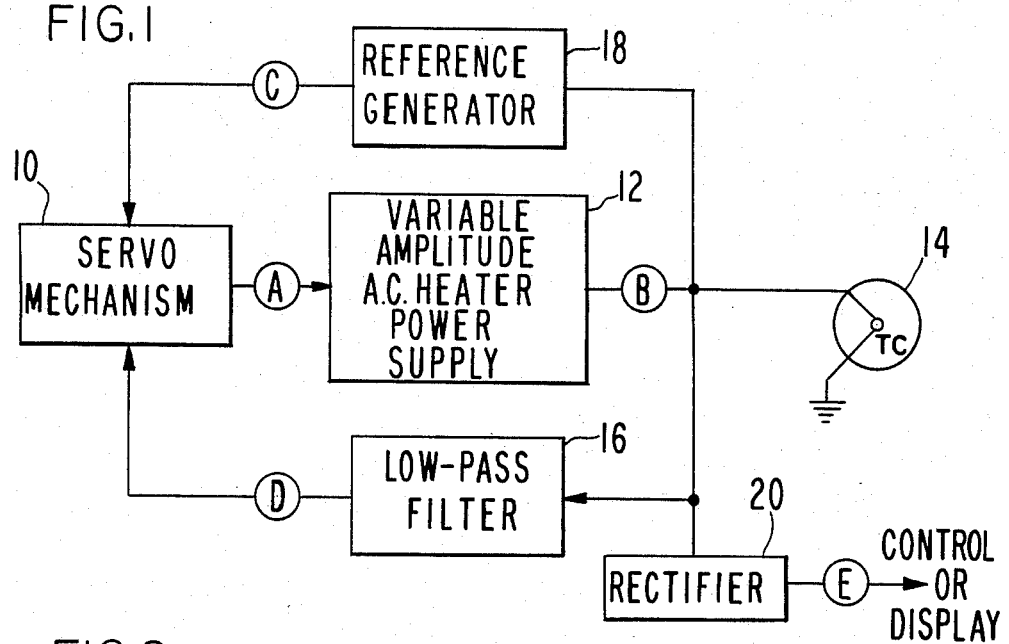
FIG. 1 is a block diagram of the thermocouple vacuum gauge according to the invention.

Referring now to the drawings wherein reference numerals are used to designate parts throughout the various figures thereof and letters to designate signals passes between parts, there is shown in FIG. 1 a block diagram of the thermocouple pressure gauge according to the invention. A servomechanism 10 is used to supply an amplitude signal "A" to variable amplitude AC heater power supply 12, which responds by creating an amplitude modulated AC current "B" to a two wire or four wire thermocouple 14. The thermally generated EMF is filtered by a low pass filter 16, creating signal "D" which is measured and compared to a reference voltage level "C" derived by a reference generator 18. The current needed to heat the junction is rectified by rectifier 20, producing a signal "E" which is proportional to the pressure and is used for control or display. The heating current is also input to the reference generator 18 which generates the reference signal "C".

Figure 2:
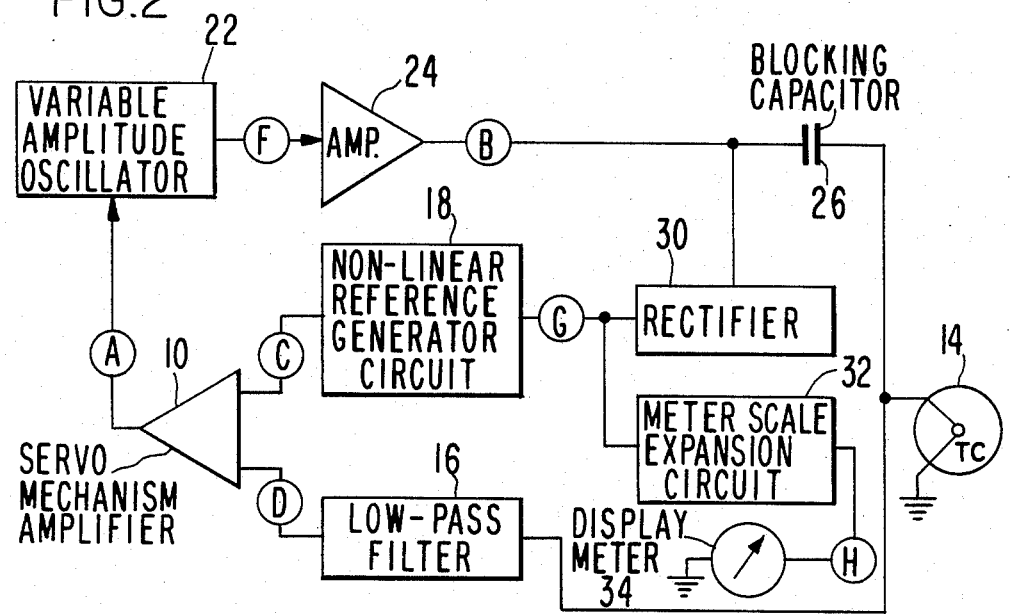
FIG. 2 is a block diagram of an embodiment of the invention.

A more detailed example of the preferred embodiment of the invention is shown in FIG. 2. A variable amplitude oscillator 22 provides an input signal "F" to amplifier 24, which provides sufficient power to heat the thermocouple 14. A blocking capacitor 26 prevents any DC levels present in the output "B" of amplifier 24 from either providing unwanted heating of the thermocouple 14 or interfering with the measurement of the DC thermocouple effect voltage from the thermocouple 14. This DC thermocouple effect voltage, present across the thermocouple along with the AC heating power from amplifier 24, is presented to low pass filter 16, which strips off the AC heating power.

Thus, signal "D", the output of the low pass filter 16, contains only the thermocouple effect voltage from thermocouple 14 and no signal due to the heating power.

Figure 3:
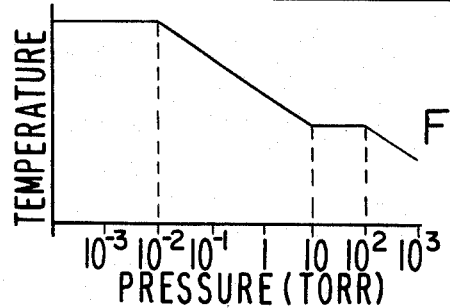
FIG. 3 is a schematic diagram of the temperature of the thermocouple versus pressure.

The heating signal "B" is rectified by rectifier 30, which provides an output "G" proportional only to the AC component of the heating signal "B". This signal "G" is presented to non-linear reference generator circuit 18. This circuit generates a reference voltage "C" which is different for different ranges of pressure and in some pressure regions becomes proportional to decreases in pressure. The output "C" of reference generator 18 produces a thermocouple temperature as a function of pressure as shown in FIG. 3.

Reference generator output "C" and low-pass filter output "D" are presented to the servomechanism amplifier 10, which creates an output "A" proportional to the sum of: (i) the integral of the difference between signals "D" and "C", and (ii) the difference between signals "D" and "C", and (iii) the derivative of the difference between signals "D" and "C", in relative proportions adjusted to give stability to the servomechanism loop.

Signal "G" from rectifier 30, proportional to the amplitude of the heating power "B", is also sent to meter scale expansion circuit 32. This circuit amplifies the signal "G" when small and saturates at large signals deriving thereby the signal "H" which is displayed on display meter 34 as a pressure signal.

A conventional power supply (not shown) is used to supply appropriate voltages to other circuits.

At lower pressure, the effect of heat loss through unwanted metallic conduction via the thermocouple wire and electromagnetic radiation are significant compared to the loss of heat by gaseous diffusion, which is the mechanism sensitive to pressure. By operating at a constant temperature in the low pressure region, the effect of temperature on conductive cooling is eliminated and its effect on radiative loss is reduced. If temperature is constant with pressure, the effect of gaseous cooling is maximized. The regions where such high sensitivity is desirable are below 10 milliTorr and between 10 and 200 Torr. In regions where the thermocouple gauge is inherently sensitive to gaseous cooling, it is desirable to decrease the sensitivity by decreasing the temperature with increasing pressure. These regions are between 10 milliTorr and 10 Torr and between 200

Torr and atmospheric pressure. A schematic diagram of temperature versus pressure for these regions is shown in FIG. 3. Manipulating the temperature as hereinbefore described allows effective measurement of pressure and enhances scale linearity over a wider range than heretofore possible, approximately six order of magnitude.

The above-described temperature variation allows for a high temperature, with accompanying enhanced sensitivity to pressure changes at low pressures where the danger of gas explosions due to the high temperature of the thermocouple does not exist, but at the same time, reduces the junction temperature to much lower, safer values at pressures where such a hazard may exist in certain gases.

The servomechanism method of indicating, and the incorporation of an indicator into the servo loop, circumvents many sources of error which would arise due to environmental changes. This minimizes the extra cost incurred in compensating for such changes.

Heating of the junction with alternating current provides two major advantages: (i) there are no extraneous contributions to the measured voltage from the heating mechanism. Such errors are inherent in other techniques which use DC power, and (ii) only a two wire junction is required, where previously a four wire junction was necessary. This results in several benefits, including a two wire cable from controller to gauge, a simplified gauge, and a 50 percent reduction in unwanted thermal conduction since the number of thermal conduction paths have been halved.

This invention is not limited to the preferred embodiments heretofore described, to which variations and improvements may be made without leaving the scope of protection of the present patent, the characteristics of which are summarized in the following claims.

What is claimed is:

1. A system for deriving an electrical signal which is responsive to pressure at partial vacuum comprising:
   a thermocouple in a partial vacuum;
   servomechanism means for generating an AC heating current to said thermocouple in response to DC voltage signal from said thermocouple;
   low pass filter means for forming a signal responsive to that pressure from the AC heating current to said thermocouple, and
   means for generating a reference signal from said signal responsive to pressure, said reference signal being used with said DC voltage signal from said thermocouple to control said servomechanism means.

2. A system for deriving an electrical signal which is proportional to pressure at partial vacuum as in claim 1 wherein said servomechanism means includes a servomechanism amplifier, a low-pass filter between said thermocouple and said servomechanism amplifier, said servomechanism amplifier receiving signals from said low-pass filter and said means for generating a reference signal, a voltage-controlled oscillator receiving a signal from said servomechanism amplifier, an amplifier receiving a signal from said voltage-controlled oscillator, and a means for passing AC current to said thermocouple while blocking DC current.

3. A system for deriving an electrical signal which is proportional to pressure at partial vacuum as in claim 2 wherein said means for generating a reference signal includes a rectifier and a non-linear reference generator circuit.

* * * * *